(12) United States Patent
Jasin

(10) Patent No.: US 9,751,660 B2
(45) Date of Patent: Sep. 5, 2017

(54) SCENT DISPENSING SYSTEM WITH ENCLOSED COLLAPSIBLE SCENT STICK HOLDER AND TREE STAND DELIVERY FEATURES

(71) Applicant: Joseph James John Jasin, Winnipeg (CA)

(72) Inventor: Joseph James John Jasin, Winnipeg (CA)

( * ) Notice: Subject to any disclaimer, the term of this patent is extended or adjusted under 35 U.S.C. 154(b) by 239 days.

(21) Appl. No.: 14/628,464

(22) Filed: Feb. 23, 2015

(65) Prior Publication Data
US 2015/0251809 A1 Sep. 10, 2015

(30) Foreign Application Priority Data
Mar. 7, 2014 (CA) ...................................... 2845065

(51) Int. Cl.
*B65D 6/00* (2006.01)
*B65D 21/08* (2006.01)
*F41H 3/00* (2006.01)
*A01M 31/00* (2006.01)
*A01M 1/20* (2006.01)
*A01M 29/12* (2011.01)
*B65D 41/04* (2006.01)
*B65D 51/24* (2006.01)

(52) U.S. Cl.
CPC ......... *B65D 21/086* (2013.01); *A01M 1/2066* (2013.01); *A01M 29/12* (2013.01); *A01M 31/00* (2013.01); *A01M 31/008* (2013.01); *B65D 41/04* (2013.01); *B65D 51/242* (2013.01); *F41H 3/00* (2013.01)

(58) Field of Classification Search
CPC .... A01M 1/2066; A01M 13/00; A01M 29/12; A01M 31/00; A01M 31/008; B65D 1/0292; B65D 1/225; B65D 21/086; B65D 7/24; B65D 7/30
USPC ............... 206/315.11, 443; 220/4.28, 6, 666; 239/53–60; 424/84; 43/1–2, 124–125, 43/127, 129, 132.1, 44.99; 211/119.06, 211/0.08
See application file for complete search history.

(56) References Cited

U.S. PATENT DOCUMENTS

| | | | | |
|---|---|---|---|---|
| 1,647,210 A | * | 11/1927 | Bryans | 604/403 |
| 1,724,743 A | * | 8/1929 | Allen | 220/8 |
| 3,285,459 A | * | 11/1966 | Gahm | 220/8 |
| 3,471,058 A | * | 10/1969 | Latham et al. | 222/92 |
| 4,361,279 A | * | 11/1982 | Beacham | A61L 9/12 239/56 |
| 4,523,717 A | * | 6/1985 | Schwab | A01M 31/008 206/225 |
| 4,802,626 A | * | 2/1989 | Forbes et al. | 239/36 |
| 4,937,431 A | | 6/1990 | Jameson et al. | |
| D309,116 S | * | 7/1990 | Marshall | D10/62 |

(Continued)

*Primary Examiner* — Anthony Stashick
*Assistant Examiner* — Kaushikkumar Desai
(74) *Attorney, Agent, or Firm* — Kyle R. Satterthwaite; Ryan W. Dupuis; Ade & Company Inc.

(57) ABSTRACT

A scent stick holder for use in hunting features an expandable and collapsible container for enclosure of the burning scent sticks on all sides during use while allowing collapse into a transport or storage condition of minimal size. The container includes features for cooperating with a delivery line to deploy and retrieve the container to and from a ground or near-ground location from an elevated tree stand.

14 Claims, 7 Drawing Sheets

(56) References Cited

U.S. PATENT DOCUMENTS

| | | | |
|---|---|---|---|
| 4,940,138 A * | 7/1990 | Hornstein | 206/218 |
| 4,973,189 A * | 11/1990 | Bechtold | 404/6 |
| 5,161,646 A | 11/1992 | Aurich et al. | |
| 5,307,584 A | 5/1994 | Jarvis | |
| 5,618,548 A | 4/1997 | Dawson | |
| 5,914,119 A * | 6/1999 | Dawson | A01N 25/20 424/40 |
| 6,029,650 A * | 2/2000 | Treants | F23D 3/16 126/204 |
| 6,241,161 B1 * | 6/2001 | Corbett | 239/58 |
| 6,447,732 B1 * | 9/2002 | West | A61L 9/03 422/126 |
| 6,648,239 B1 | 11/2003 | Myny et al. | |
| 6,666,329 B1 * | 12/2003 | Charbonneau | 206/218 |
| 7,506,611 B1 * | 3/2009 | Lush | 119/52.1 |
| 7,607,425 B2 * | 10/2009 | Knight | 126/9 R |
| 8,596,222 B1 * | 12/2013 | Campbell et al. | 119/498 |
| 2004/0234567 A1 | 11/2004 | Dawson | |
| 2006/0088500 A1 | 4/2006 | Cole | |
| 2009/0218240 A1 * | 9/2009 | Allen et al. | 206/214 |
| 2013/0055619 A1 | 3/2013 | Stewart | |

* cited by examiner

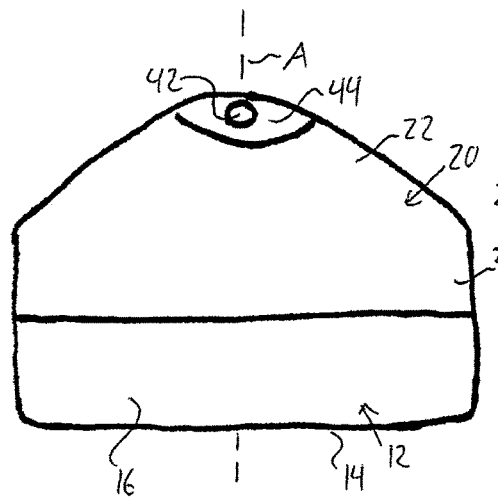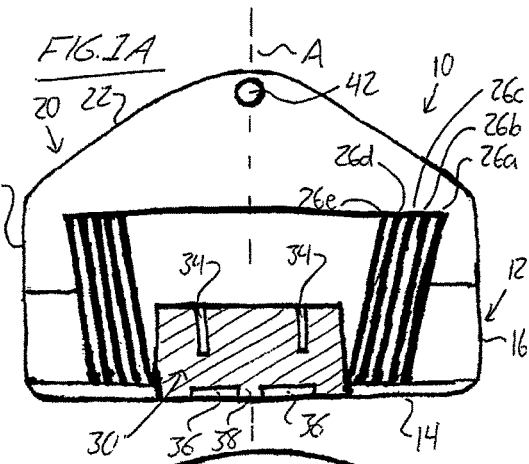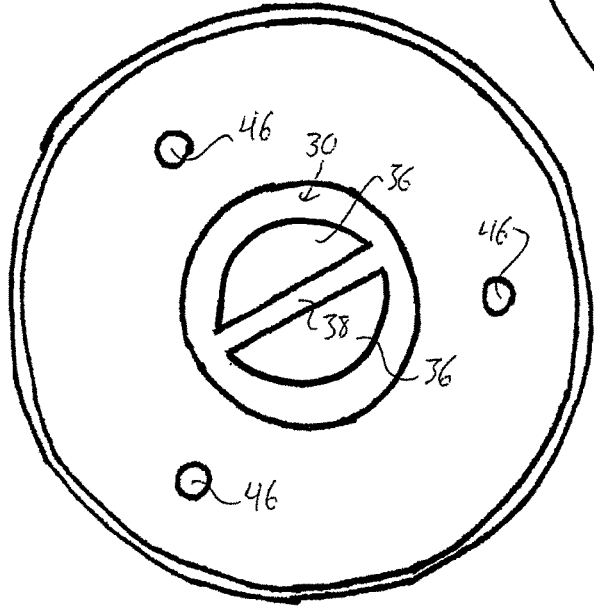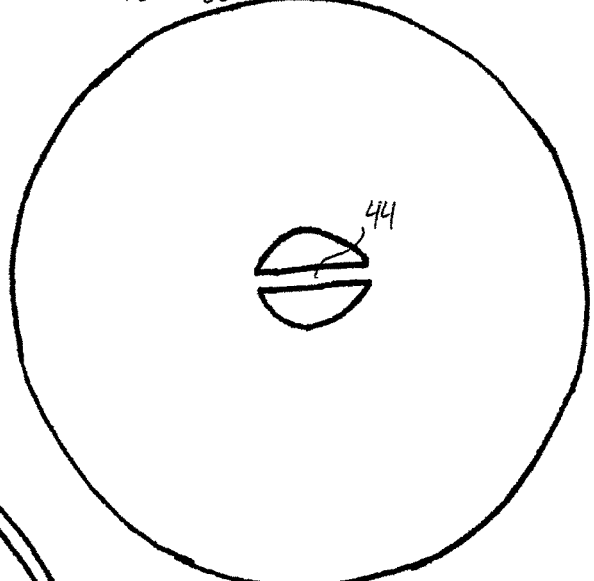

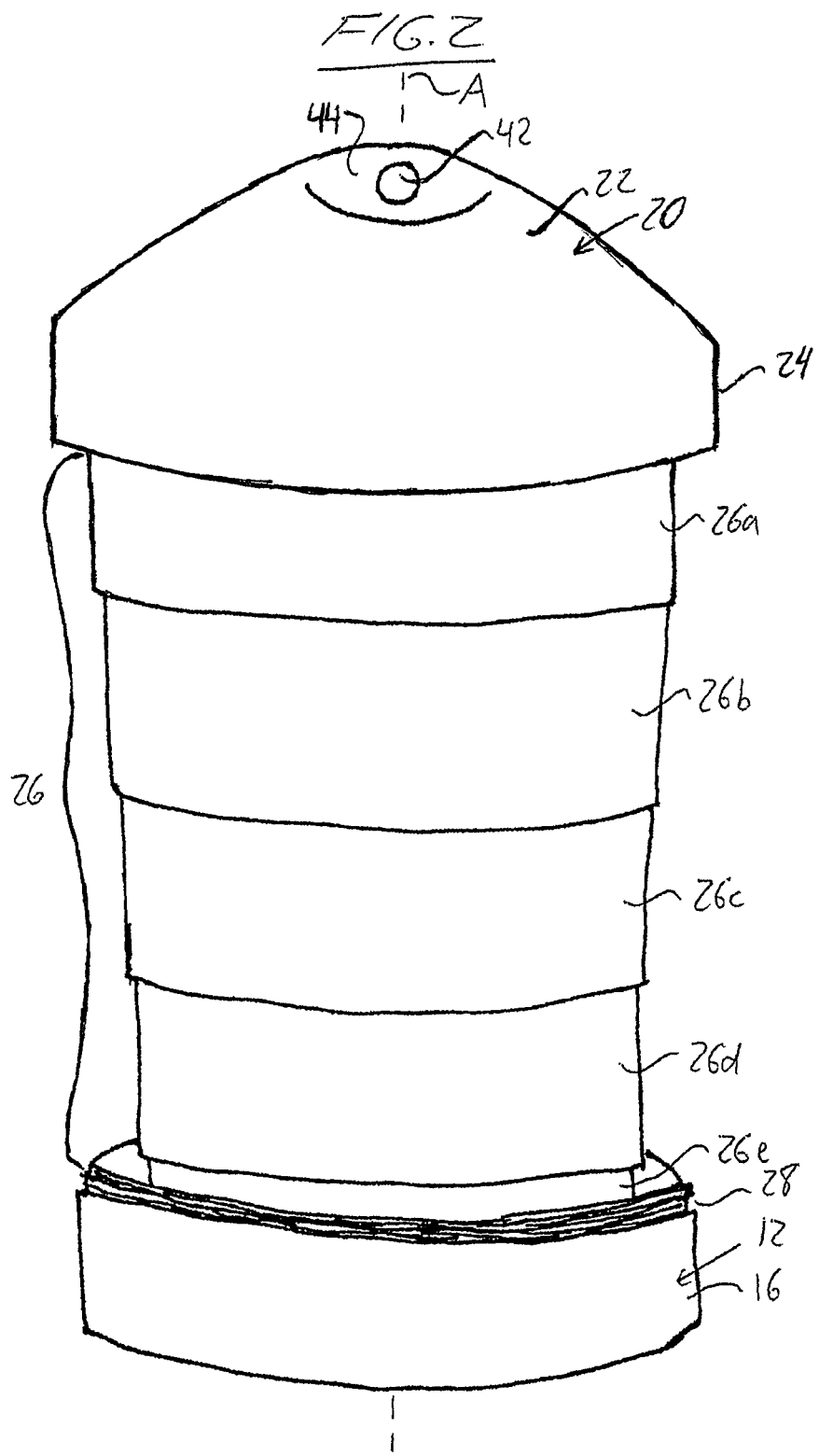

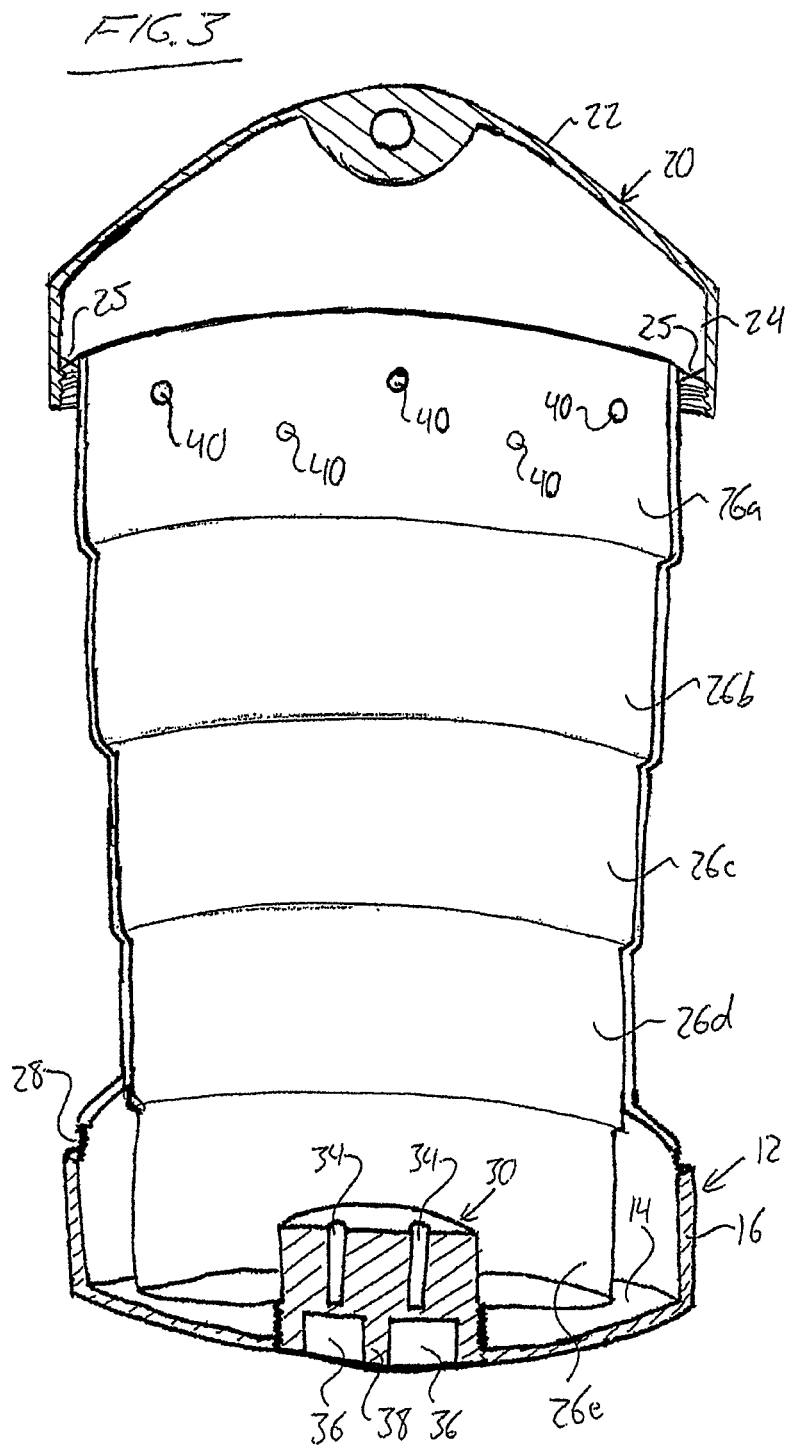

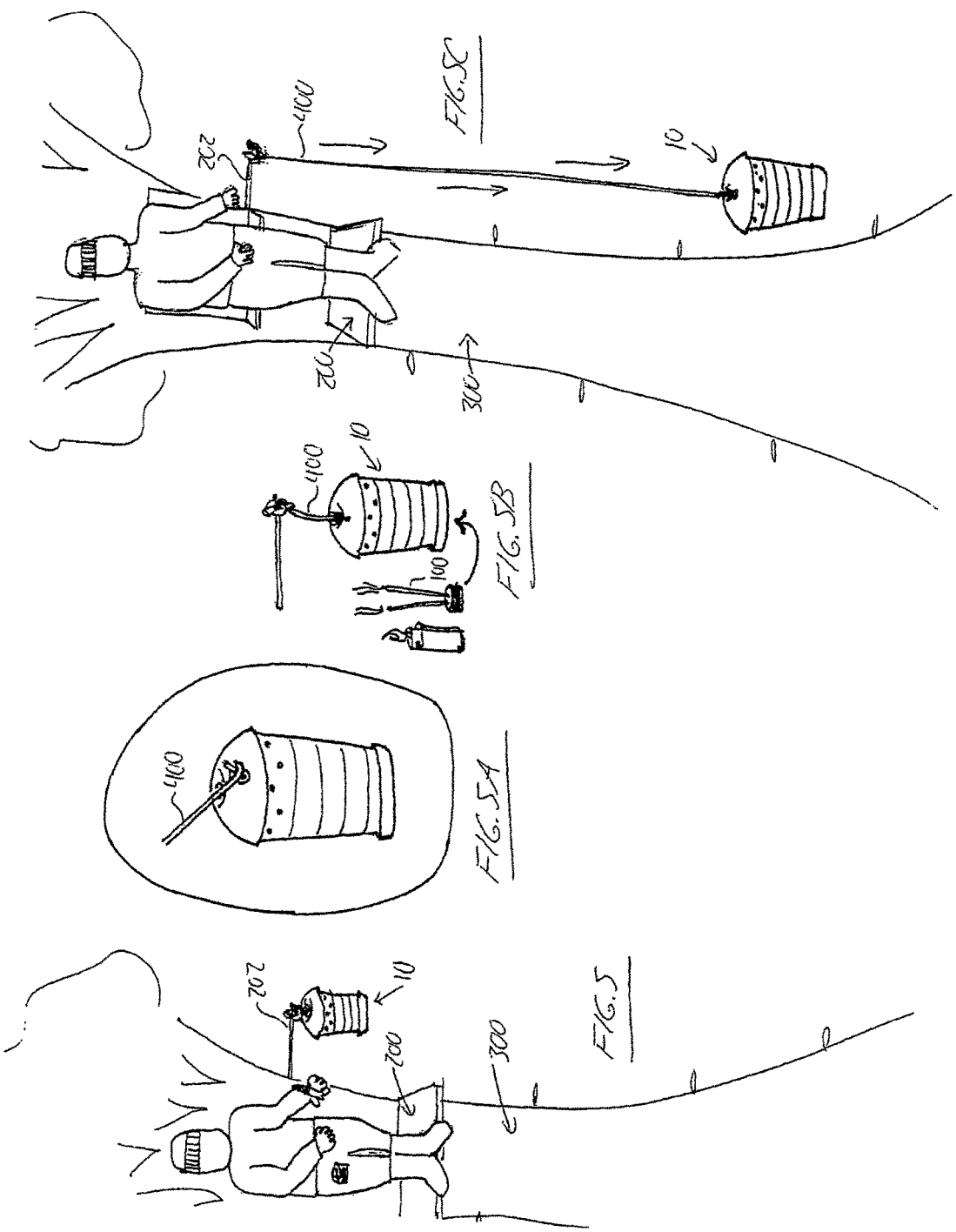

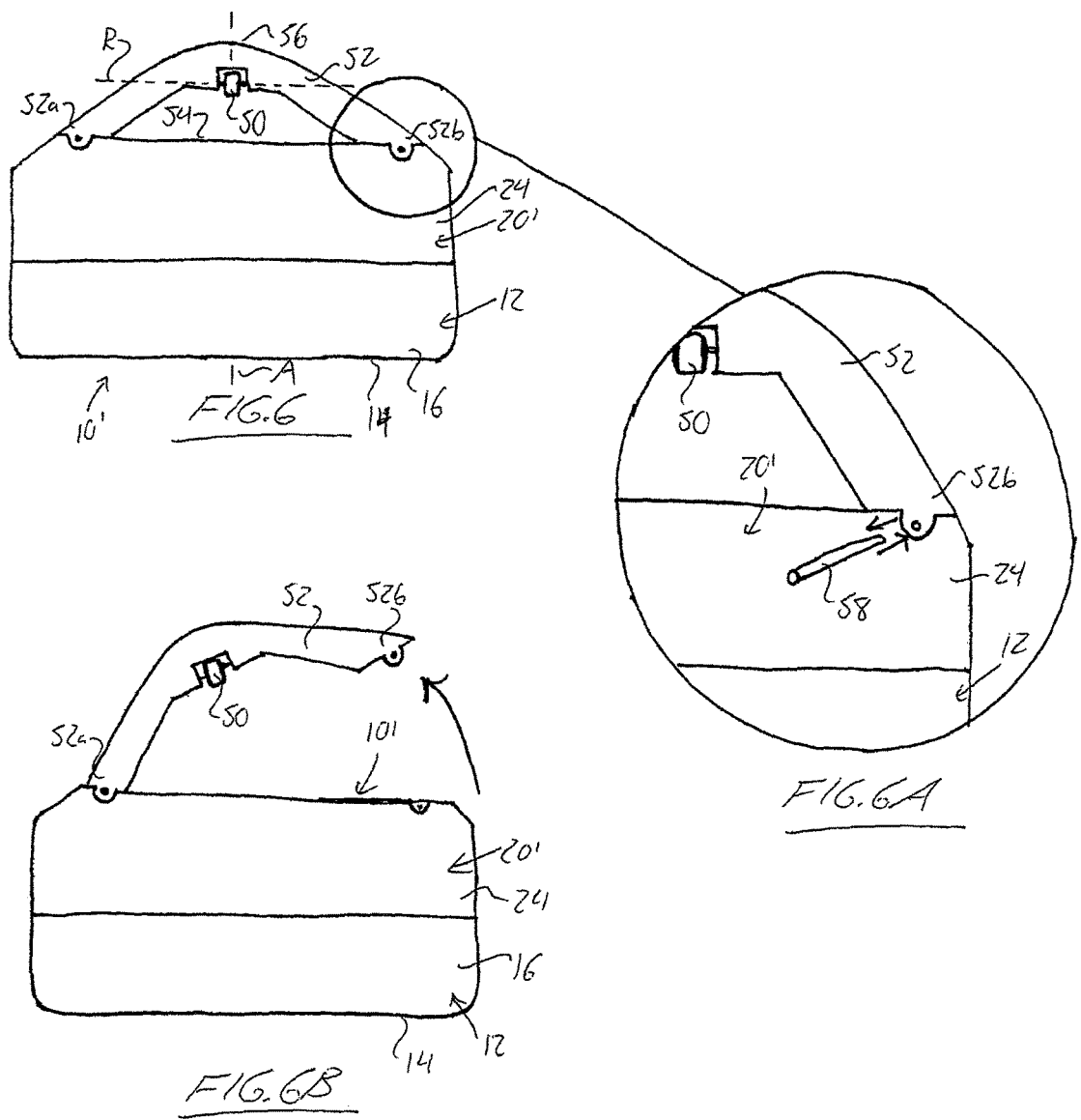

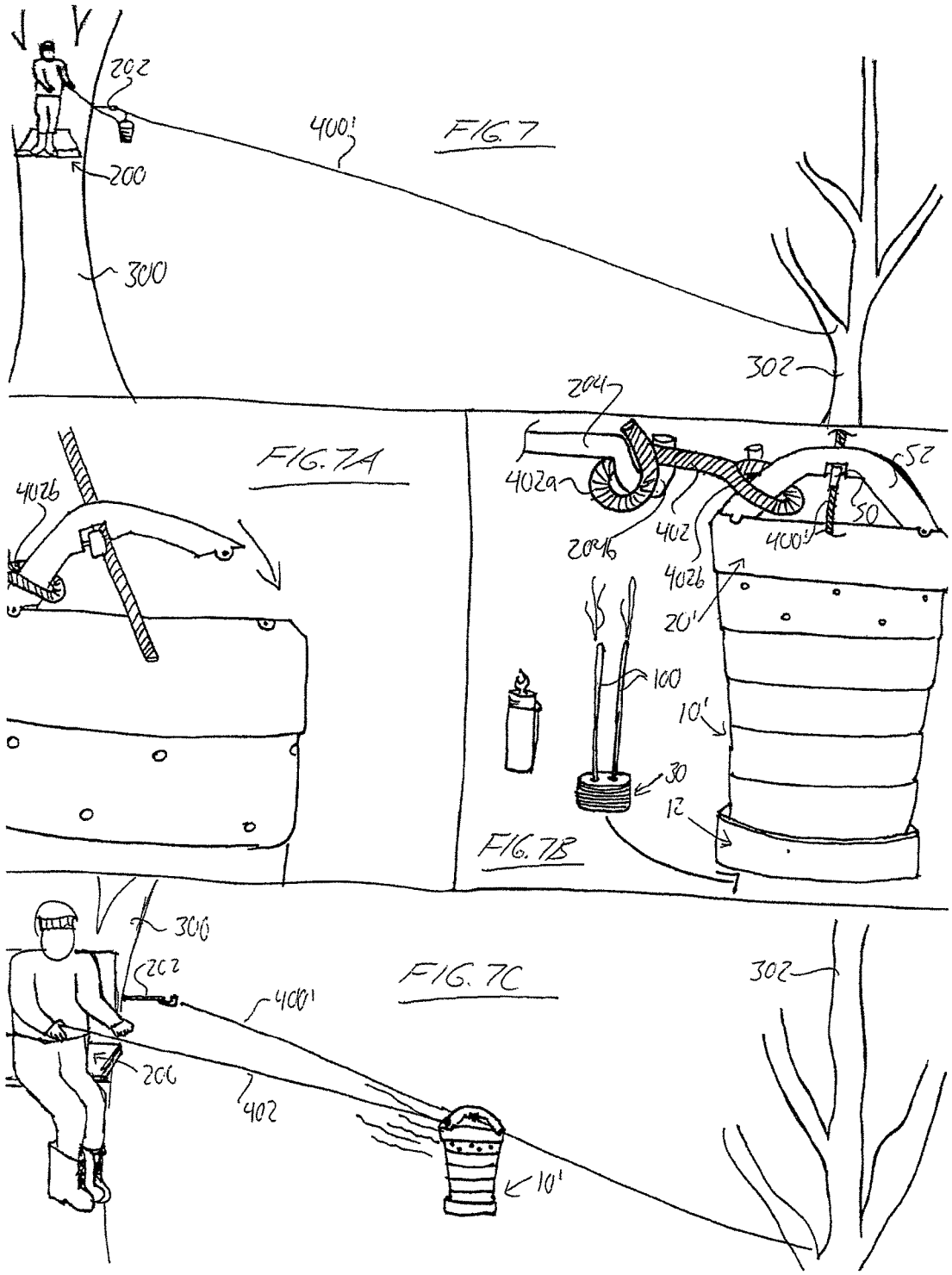

SCENT DISPENSING SYSTEM WITH ENCLOSED COLLAPSIBLE SCENT STICK HOLDER AND TREE STAND DELIVERY FEATURES

CROSS REFERENCE TO RELATED APPLICATIONS

This application claims benefit under 35 U.S.C. 119(a) of Canadian Patent Application Serial No. 2,845,065, filed Mar. 7, 2014.

FIELD OF THE INVENTION

The present invention relates generally to holders for supporting burning scent sticks used by hunters to lure game and mask human odor, and more particularly to a unique holder that safely encloses the scent sticks within a container that is collapsible for maximum portability and includes features useful for delivering the holder and burning scent sticks down toward the ground from a tree stand without leaving same.

BACKGROUND

U.S. Pat. Nos. 5,618,548 and 5,914,119 by Richard A. Dawson disclose incense sticks in which the combustible material has an animal-attracting aromatic substance impregnated therein so as to release a game-luring scent when the material is ignited and allowed to gradually burn in a smoldering manner. Such incense sticks or scent sticks are becoming more popular in the hunting community, as evidenced by a notable increase in the commercial availability of same at hunting retailers.

The forgoing references disclose shelters for shielding such scent sticks from weather conditions (wind, rain, etc.) to prevent these weather elements from causing early termination of the smoldering burn of the scent stick. However, these prior art shelters do not enclose the scent sticks on all sides, and rely on engagement of the scent sticks into the ground to support them in an upright position. There may be a potential risk that a strong wind or interfering animal may knock over the smoldering scent stick, which may present a fire risk in the event of dry ground cover. In addition, the disclosed shelters are either of a pre-formed type of notable size, which that may be inconvenient for hunters to convey through the woods or other difficult terrain, especially when burdened by other hunting equipment (firearms, tree stands, drinking water, etc.), or require on site assembly of more portable components, such as a coat hanger and coffee can lid.

U.S. Patent Application Publication 2004/0234567 discloses another scent stick shelter, which is provided in the form of a foldable plastic blank that uses cooperating tabs and slots that maintain the shield in a tubular form when engaged together. However, the scent stick is again engaged in the ground, and thus not enclosed on all sides, and although the blank-type form of the product provides a flat configuration for transport, the flattened blank still occupies notable surface area, since each wall of the resulting tubular shield needs to have a length exceeding that of the scent stick so as to provide a full height wind block for same.

In addition, the forgoing references provide no solution for allowing a hunter to deploy a scent stick from a tree stand to a ground-adjacent position where the released luring scent will be most detectable to ground-roaming game.

Examples of other scent releasing devices using aromatic sources other than burning incense sticks are also known, examples of which can be seen in U.S. Pat. Nos. 4,937,431, 5,161,646 and 5,307,584. However, these references provide no teaching or suggestion of suitable solutions to the forgoing issues of portable and safe enclosure and tree-stand deployment of combustible scent sticks.

Accordingly, there a desire for improved scent stick solutions addressing the forgoing shortcomings of the prior art.

SUMMARY OF THE INVENTION

According to a first aspect of the invention, there is provided a scented stick product comprising a stick having a predetermined length and, carried on said stick, a combination of combustible material and combustion-released aromatic:
  a container comprising:
  a base;
  a cap overlying the base; and
  an intermediate container section comprising a series of wall sections joining the base and cap together and being movable relative to one another to expand and collapse the intermediate container section along a longitudinal axis that passes through said base and said cap in order to move said base and said cap away from and toward one another to enlarge and reduce an enclosed interior space of the container between said base and cap, the intermediate section being expandable to an extended state in which an axial length of the container measured between the base and the cap within the enclosed interior space exceeds the predetermined length of the scented stick product, and collapsible to a collapsed state in which the axial length of the container measured within the enclosed interior space between the base and the cap is less than the predetermined length of the scented stick product;
  a scent stick support arranged to support the scented stick product in position standing upright from the base toward the cap with the intermediate container section expanded into the extended state; and
  at least one opening in the container arranged to communicate the enclosed interior space with an external environment outside the container, at least when said intermediate container section is in the extended state.

According to a second aspect of the invention, there is provided a scent stick holder comprising:
  a container comprising:
  a base;
  a cap overlying the base; and
  an intermediate container section joining the base and cap together and being expandable and collapsible between extended and collapsed states along a longitudinal axis that passes through said base and said cap in order to move said base and said cap away from and toward one another to enlarge and reduce an interior space of the container between said base and cap;
  a scent stick support arranged to support at least one scent stick in position standing upright from the base toward the cap within the enlarged interior space achieved by expansion of the intermediate container section; and
  at least one opening in the container arranged to communicate the interior space with an external environment outside the container, at least when said intermediate container section is expanded;

wherein the intermediate container section comprises a series of wall sections closing around the longitudinal axis and telescopically arranged for telescopic extension and retraction along the longitudinal axis.

Preferably the opening is in one of the wall sections.

Preferably the scent stick support is removable from the container.

Preferably a floor of the base comprises a floor panel having an opening therein for selective engagement of the scent stick support to the floor of the base at said opening.

Preferably there are provided mating threads on the container and the scent stick support for threaded engagement and disengagement of said scent stick support with said container.

Preferably the wall sections are each tapered relative to the longitudinal axis in a same direction, and for each pair of adjacent wall sections, a smaller-diameter one of two ends of an outer one of said adjacent wall sections is smaller in diameter than a larger-diameter one of two ends of an inner one of said adjacent wall sections.

Preferably there is provided a locking mechanism operable to hold the intermediate container section in a collapsed state.

Preferably the locking mechanism comprises cooperable features on the base and the cap for holding the base and the cap together with the intermediate container section in the collapsed state therebetween.

Preferably the cooperable features of the locking mechanism comprising matable threaded portions of the base and the cap.

There may be provided a pulley attached to the container for rollable support of the container on a delivery line strung between two points to enable relocation of the container along said delivery line.

Preferably the pulley is rotatably carried on a pulley support that is attached to the cap.

Preferably the pulley support spans over the pulley for attachment to the cap on either side of the pulley, and the pulley support has a detachable end that is releasable from the cap to enable insertion of the delivery line into a space between the pulley support the cap to allow placement of the pulley onto the line with the detachable end of the pulley support re-attached to the cap.

Preferably the pulley support is pivotally attached to the cap at a second end of the pulley support opposite the detachable end thereof.

According to a third aspect of the invention, there is provided a scent stick holder comprising:

a container enclosing an interior space and comprising a base at a lower end of said interior space, the base comprising a floor panel having a support opening therein;

a scent stick support plug that is shaped for mating with the support opening in the floor panel of the container in a manner removably attaching the support plug to the base of the container in a position operable to support at least one scent stick in position standing upright from the base within the interior space of the container; and at least one communication opening in the container for communicating the interior space between said base and said cap with an external environment outside the container;

wherein the scent stick support plug is detachably engaged to the floor panel of the base in a re-attachable manner from a side of the floor panel facing away from the cap and the intermediate container section, whereby the scent stick support plug is attachable to and detachable from the base without disassembly of the base from the intermediate container section and cap.

Preferably there are provided mating threads on the floor panel and the scent stick support plug for threaded engagement and disengagement of said scent stick support plug with the support opening of the floor panel.

According to a fourth aspect of the invention, there is provided a scent stick holder comprising:

a container having an interior space for receipt of at least one scent stick therein;

at least one opening in the container for communicating the interior space with an external environment outside the container; and a pulley attached to the container for rollable support of the container on a delivery line strung between two points to enable relocation of the container along said line;

wherein the pulley is rotatably carried on a pulley support that is attached to an upper portion of the container above the interior space thereof, spans over the pulley for attachment to the upper portion of the container on either of the pulley, and has a detachable end that is releasable from the cap to enable insertion of the delivery line into a space between the pulley support and the upper portion of the container to allow placement of the pulley onto the line with the detachable end of the pulley support re-attached to the upper portion of the container.

According to a fifth aspect of the invention, there is provided a method of deploying an animal luring scent for attracting game from a tree stand, the method comprising:

tying a delivery line to a first point at a distance outward from a tree at which the tree stand is supported and at an elevation lower than said tree stand;

accessing the tree stand, and at said tree stand, pulling the delivery line taught and tying the delivery line to a second point on or near the tree stand to defined a sloped path of the delivery line between the first and second points;

with a burning scent stick disposed within a container, and using one or more pulleys that are attached to the container and a tether line that is tied to the container, manually letting out the tether line in order to roll the container downwardly toward the ground from the tree stand on the sloped travel path of the delivery line in order to release an animal luring scent from a location nearer to ground level than the three stand.

BRIEF DESCRIPTION OF THE DRAWINGS

Exemplary embodiments of the invention will now be described in conjunction with the accompanying drawings in which:

FIG. 1 is a side elevational view of a scent stick holder of a first embodiment of the present invention with a container of the holder in a collapsed condition for efficient storage and convenient transport.

FIG. 1A is a schematic cross-sectional view of the scent stick holder of FIG. 1.

FIG. 1B is a top plan view of the scent stick holder of FIG. 1.

FIG. 1C is a bottom plan view of the scent stick holder of FIG. 1.

FIG. 2 is a perspective side view of the scent stick holder of FIG. 1 in an expanded condition ready for use to support scent sticks within an interior of the container in a safely enclosed manner.

FIG. 3 is a cross sectional view of the scent stick holder of FIG. 2.

FIG. 5 illustrates a hunter preparing to deploy the scent stick holder of FIG. 1 from a tree stand.

FIG. 5A illustrates a first step of the preparation in which the hunter ties a delivery line to a cap of the container.

FIG. 5B illustrates a second step of the preparation in which the hunter removes the scent stick support plug, inserts the scent sticks into the topside of same, ignites the scent sticks and re-engages the plug to the base of the container to place the smoldering scent sticks within the interior space of the container.

FIG. 5C illustrates deployment of the scent stick holder of FIG. 5 by toward the ground by lowering the container-connected end of the delivery line down from the tree stand.

FIG. 6 is a side elevational view of a second embodiment scent stick holder in the collapsed condition, which differs from the first embodiment in the addition of a pulley-carrying support handle at the top of the container.

FIG. 6A illustrates use of a retaining pin to lock and unlock a releasable end of the pulley support handle of the scent stick holder of FIG. 6 to allow lifting of the pulley support handle upward from container via an opposing hinged end thereof.

FIG. 6B illustrates the lifting of the pulley support handle via the hinged end thereof with the releasable end unlocked by removal of the retaining pin.

FIG. 7 illustrates a hunter preparing to deploy the scent stick holder of FIG. 6 from a tree stand.

FIG. 7A illustrates a first step of the preparation in which the hunter unlocks and lifts the releasable end of the pulley support handle in order to relock the same in a position spanning over a sloped delivery line that is strung between the stand-equipped tree and another tree spaced therefrom.

FIG. 7B illustrates a second step of the preparation in which the hunter temporarily ties the pulley support handle to the tree stand to prevent it from moving down the delivery line while the hunter lights and places the scent sticks in the in the container in the same manner as the first embodiment.

FIG. 7C illustrates deployment of the scent stick holder of FIG. 7 by tether-controlled conveyance of the container down the sloped delivery line toward a lower point closer to the ground.

In the drawings like characters of reference indicate corresponding parts in the different figures.

DETAILED DESCRIPTION

Figure 4A:
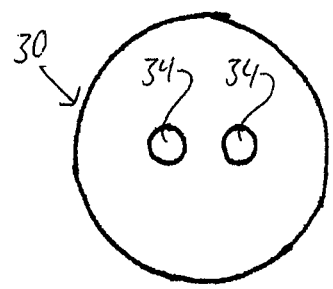
FIG. 4A is a top plan view of a scent stick support plug of the scent stick holder of FIG. 1 in a state removed from a base floor of the container to enable engagement of scent sticks to the plug before reinsertion thereof into the base floor of the container.

FIGS. 1 to 3 illustrate a first embodiment scent stick holder of the present invention which features an expandable and collapsible container 10 featuring a removable and reinsertable scent stick support for holding one or more scent sticks in an upright position enclosed within the interior space of the container. FIG. 1A schematically shows a cross-sectional view of the container in the collapsed condition that minimizes the size of the container for convenient transport, for example in a hunter's pack or clothing pocket. The collapsed size of the container is insufficient in axial length to accommodate placement of scent sticks inside its reduced interior space however, and so the container is extendable in this axial dimension to enlarge the interior space in order to prepare the scent stick holder for use. Further detailed description of the structure and operation of the holder is described as follows.

A base 12 of the scent stick holder 10 features a floor panel 14 with a cylindrical peripheral wall 16 upstanding therefrom around the circular perimeter of the floor panel 14. The flat underside of the floor panel at least partly defines a bottom end of the container that can be seated on the ground or another generally horizontal support surface in order to situated the container in a position standing upright therefrom. The floor panel 14 is annular or ring-shaped in form, having a central through-hole therein that lies concentric to the surrounding perimeter wall 16 of the base 12. The floor panel 14 is threaded at the boundary wall of this through-hole so as to define an internally-threaded bore that passes upward through the floor panel from the bottom end of the container and into the interior space of the container.

A cap 20 of the container overlies the base 12 and features a generally dome-shaped upper portion or cover 22 with a cylindrical perimeter wall 24 that depends downward from the peripheral rim of the dome in concentric relation to the perimeter wall 16 of the base 12. That is, the two perimeters walls 16, 24 close concentrically around a shared central axis A that passes perpendicularly through the floor panel 14 of the base to define a longitudinal direction of the container along which the container is expandable and collapsible. The base 12 and the cap 20 are connected together by a series of telescopically-mated frustoconical wall sections 26, a largest outermost one of which 26a of which has its larger-diameter upper end fixed to the cap inside the perimeter wall thereof 24 and beneath the dome shaped cover 22, as schematically shown with an "x" in FIG. 3 at reference character 25. A smallest innermost one of the frustoconical wall sections 26e has its smaller-diameter lower end fixed to the base inside the perimeter wall 16 at the topside of the floor panel. The wall sections 26 all taper in diameter in the same direction at the same angle relative to the longitudinal axis A. In the illustrated embodiment, each one narrows in a downward direction toward the floor panel 14 of the base 12.

FIG. 1A shows the collapsed state of the container, in which the perimeter walls 16, 24 of the base 12 and cap 20 are mated together and the series of frustoconical wall sections are nested within one another in concentric positions around the longitudinal axis A within the interior space of the collapsed container that is enclosed between the domed cover 22 of the cap 20, the floor 14 of the base 12 and the two perimeter walls 16, 24 that are mated together at their respective distal ends furthest from the dome and floor of the cap and base. Moving radially inward toward the longitudinal axis A from one wall section to the next, the bottom end of each frustoconical wall is smaller in diameter than the top end of the next frustoconical wall section, but larger than the bottom end of that next frustoconical wall section. The illustrated embodiment features three intermediate wall sections 26b, 26c, 26d disposed between the largest outermost walls section 26a furthest from the central axis A and the smallest innermost walls section 26e nearest the central axis A.

The above described configuration of nested frustoconical walls in the collapsed container allows for telescopic extension of the container along the longitudinal axis A by pulling the cap 20 and base 12 away from one another. Upward pulling of the cap 20 slides the largest wall section 26a upward along the exterior of the second-largest walls section 26b, until the smaller-diameter lower end of the largest wall section 26a reaches a point of matching diameter at the exterior of the second largest wall section 26b near the top end thereof, where the interfering sizes of the top end of the second-largest wall section 26b and the bottom end of the largest wall section 26a cooperate to block sliding of the largest wall section past the top of the second largest wall section 26b. This way, telescopic sliding of the two walls sections relative to one another is allowed, while axial separation of the wall sections is prevented. The same relationship exists between the second and third largest wall sections 26b, 26c; between the third and fourth largest wall sections 26c, 26d; and between the fourth largest 26d and fifth largest (i.e. smallest) 26e wall sections. Accordingly, when the largest wall section 26a reaches the point at which it is frictionally prevented from sliding further upward on the second largest wall section 26b, further upward pulling of the cap then draws the second largest wall section 26b upwardly along the exterior of the third largest wall section 26c.

With reference to FIG. 2, the upward pulling of the cap eventually causes full extension of the telescopically mated wall sections 26, thereby attaining a fully extended condition of the container in which the longitudinal dimension of the container's interior space bound between the cap and base is maximized. The container automatically retains this fully extended state due to the frictional fit between each pair of adjacent wall sections. That is, the interference fit between the smaller lower end of each of the four outermost (largest) wall sections with the larger upper end of the next-largest wall section frictionally acts to hold the positions of the wall sections stationary to one another, thus also maintaining the cap and base at a predetermined distance from one another that corresponds to a maximum available interior length between the floor panel 14 of the base 12 and the dome 22 of the cap. To subsequently return the container to the fully collapsed state of FIG. 1 from the fully extended position of FIG. 2, the base and cap are simply pushed together by the user with sufficient force to overcome the frictional hold between the telescopic wall sections 26.

As shown in FIG. 2, the distal top end of the perimeter wall 16 of the base features external threading 28, and the distal bottom end of the perimeter wall 24 of the cap has mating internal threading thereon, whereby having substantially collapsed the telescopic wall sections 26 in order to bring these ends of the perimeter walls into proximity with one another, a user can threaded together the perimeters walls in order to lock the base and cap to one another and thus maintain a fully collapsed condition of the container in which the axial length of the interior space between the floor of the base and the dome of the cap is at a predetermined minimum that is long enough to accommodate the nested wall sections, but not long enough to accommodate the length of a typical scent stick. It will be appreciated that thread-together base and cap pieces may employ the reverse configuration of threading, i.e. external threading on the cap and internal threading on the base. The telescopically mated wall sections are freely rotatable relative to one another about the longitudinal axis A, thus enabling the relative rotation required between the cap and base in order to thread and unthread them together and apart.

Figure 4B:
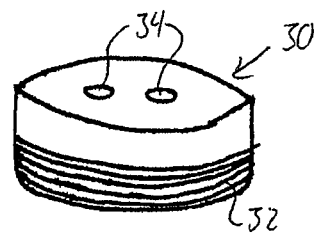
FIG. 4B is a side perspective view of the scent stick support plug of FIG. 4A.
Figure 4C:
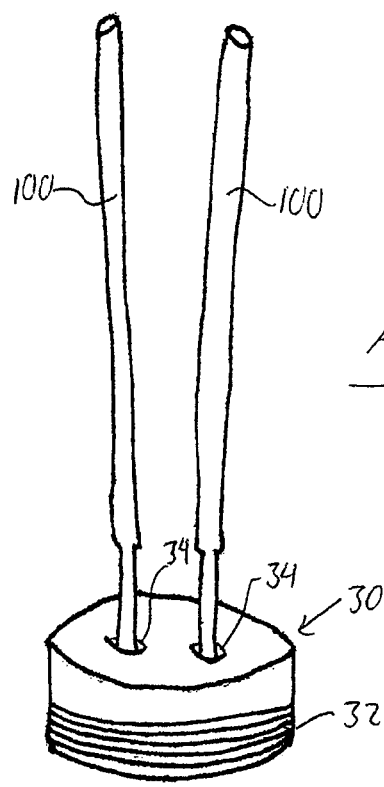
FIG. 4C is a side perspective view of the scent stick support plug of FIG. 4B after insertion of the scent sticks into the topside thereof so as to stand upright within the container when the plug is reinserted into the base floor of the container.

A removable plug 30 is provide for selective attachment and detachment with the base by way of an externally threaded lower portion 32 of the plug that is matable with the internally threaded central bore of the floor panel 14. An upper portion of the plug 30 features two blind holes 34 extending into the plug from a top end thereof that faces upwardly toward the cap at a short height above the floor panel 14 within the interior space of the container when the plug 30 is engaged with the base. The bottom end of the plug resides flush with, or slightly raised from, the flat bottom of the annular floor panel 14 when the plug is fully engaged with the base. The bottom end of the plug also features two recesses 36 disposed on opposite sides of a ridge or lip 38 that is left intact between these recesses, thereby forming a finger grip by which the plug can be manually rotated to install and remove the plug by way of a screwing action. Particularly, the user reaches his/her thumb and finger into the recesses to grip the ridge 38 from opposing sides thereof. FIGS. 1A and 3 show the plug in its installed position attached to the base in this manner, while FIG. 4 shows the plug in isolation.

A series of holes 40 are spaced circumferentially around the largest wall section 26a that resides at the top of the expanded series when the container is extended, and a through-hole 42 passes through a flattened tab-like area 44 at the peak of the otherwise dome-shaped upper portion of the cap. This hole 42 passes through the flattened tab area in a direction lying perpendicularly across the longitudinal axis A of the container. As shown in FIG. 1C, drainage holes 46 are provided in the floor panel 14 of the base at locations radially outward from the threaded central bore that accommodates insertion and removal of the plug 30, whereby any liquid that may collect in the container can drain from the bottom end of the container through these drainage holes.

To use the container to hold one or more scent sticks, the container is expanded from the collapsed storage or transport position of FIG. 1 into the extended use position of FIGS. 2 and 3, which expands the axial length of the container's interior space from a minimum value that is shorter than the length of a typical scent stick to a maximum values that is longer than the typical scent stick length. Before or after this extension of the container, the plug 30 is removed from the base, and at least one scent stick 100 has its lower end (i.e. the exposed wood end that is not covered by the aromatic-impregnated combustible material that releases an animal luring scent when burned) inserted into a respective one of the blind holes 34 in the topside of the plug, whereby the scent stick is supported in a position standing upright from the plug 30. The illustrated embodiment features two such blind holes 34, thereby allowing support of one or two scent sticks by the plug. The number of stick-supporting holes 34 may be varied, whether reduced down to a single hole for supporting only a single scent stick at any time, or increased to more than two holes. The combustible material on the stick is ignited by the user, for example using a lighter, match or other suitable ignition source, and any resulting open flame on the scent stick is blown out in order to achieve a smoldering state for gradual release of the aromatic material from the scent stick over time.

With the container standing or hanging in an upright position, i.e. with the cap 20 elevated over the base 12 and with the longitudinal axis A oriented generally vertically, the plug 30 is gripped from beneath, inserted upwardly into the central hole of the floor panel 14 of the container, and rotated into threaded engagement therewith. This acts to place the smoldering scent sticks inside the expanded interior space of the container in positions standing upwardly away from the floor panel 14 of the base 12 toward the cap 20. The smoldering sticks are safely enclosed within the confines of the cooperating base, cap and extended wall sections that form an intermediate section of the container that spanns between the base and cap. The holes 40 in the uppermost wall section fluidly communicate the interior space of the container with the surrounding external environment outside the container, whereby the smoke and scent from the smoldering scent sticks can waft from the container interior out into the surrounding environment in order to attract game toward the location of the container.

In one mode of use of the container, it is simply placed on the ground by hand. However, the container may also be deployed into a seated position on the ground, or a hanging position a short distance above the ground, from an elevated location, for example from a tree stand 200 erected at an elevated position on a tree 300, as shown in FIG. 5. Initially, the hunter carries the container in its fully collapsed and locked condition, for example in a pocket of the hunter's clothing or within a pack carried elsewhere on the hunter's body, whereby the hunter can climb up to the tree stand unfettered by the need to manually carry or otherwise transport a scent stick holder of notable size, weight or bulk. With reference to FIG. 5A, the hunter first ties a line of rope, cable or string to the top-end through-hole 44 of the container and to a suitable anchor point 202 on or near the tree stand 200 so as to securely suspend the container in an upright hanging position below this anchor point 202. The hunter than grasps the ridge 38 of the plug 30 between his/her thumb and forefinger and uses the same to unscrew the plug from the bottom of the base. Turning to FIG. 5B, the hunter than places the desired scent sticks into the blind holes 34 in the topside of the plug 30, and ignites the scent sticks. The plug on which the scent sticks are supported is reinserted into the base of the container in order to place the scent sticks within the container's enclosed interior space.

Turning to FIG. 5C, with the container tied to one end of a line 400 (e.g. continuing to be tied to the same line previously used to hang the container in place and prevent falling thereof from the tree stand while the user removed and reinstalled the plug in order to insert the scent sticks), the container is lowered gradually down toward the ground through controlled lowering of this container-carrying end of the rope. The container is lowered in this fashion until the container reaches a desired elevation at which the hunter wishes to disburse the animal luring scent. The hunter may choose whether to fully lower the container to ground in order to seat the base of the container on the ground with the container standing upright therefrom, or whether to tie off the line to the anchor point 202 before the container reaches the ground, thereby suspending the container at a desired height above the ground, but below the tree stand.

Through this process, the scent sticks are thus safely conveyed down to the desired scent disbursement elevation without having to depart the tree stand. When the current scent sticks have burned out, the container-tied end of the line can be pulled back up to the tree stand in order to reload the container with new scent sticks and enable redeployment of the container back down to the ground, all without having to depart the tree stand. The base, cap and the extended intermediate wall sections of the container safely enclose the burning scent sticks on all sides to minimize exposure of the scent sticks to the elements (wind, rain, etc.) and to minimize the potential fire hazard in the event that the container inadvertently tips or falls into a non-upright position on the ground. Should such an event occur, the container can be pulled back up into the upright position, or pulled all the way back up to the tree stand, using the line 400 that remains tied to the container.

FIGS. 6 and 7 illustrates a second embodiment container 10' in which the stationary through hole 44 at the top of the container cap 20 for tying of a delivery line 400 to the container is instead replaced with a pulley 50 that is rotatably carried on a movable pulley support handle 52, whereby the container can be conveyed from a tree stand 200 down to a desired scent distribution point in a zipline-like manner by sliding down a delivery line that is strung between the tree stand anchor point 202 an another tree 302 or attachment point situated at a distance from the stand-equipped tree 300.

Referring to FIG. 6, the pulley support handle 52 is generally arch-shaped and resides over a flat top 54 of the cap 20' that takes the place of the domed top of the first embodiment. A hinged end 52a of the support handle 52 is mounted to the topside of the cap 20' near the perimeter thereof, from which the handle 52 slopes upwardly to a peak 56 residing at the longitudinal axis A of the container. The pulley 50 is supported on the handle 52 beneath the peak 56 thereof for rotation on a shaft that lies perpendicular to the longitudinal axis A in the same plane in which the handle extends from the hinged end to an opposing releaseable end 52b that lies diametrically opposite the hinged end. The hinged end 52a is pivotal about an axis that is perpendicular to both the longitudinal axis A of the container and the rotational axis R of the pulley 50. As schematically shown in FIG. 6A, the releasable end 52b of the handle 52 is selectively lockable to the cap by a suitable locking arrangement, for example by way of a retaining pin 58 that is engagable through a hole in the handle that aligns with a respective hole in the cap when the releasable end 52b is lowered into a seated position on the cap. By removal of the retaining pin, the releasable end 52b of the handle can be raised about the pivot axis of the hinged end 52a into an open position, in which the releasable end is spaced a distance above the topside 54 of the cap, as shown in FIG. 6B, thereby opening up an access space between the handle 52 and the cap for reasons described below with reference to FIG. 7.

Now turning to FIG. 7, for conveyance of the second embodiment container from a tree stand, the support or delivery line 400' for lowering the container down toward the ground is not simply hung straight down from the anchor 202 that juts outwardly away from the trunk of the tree 300 in which the tree stand is setup, but rather is strung between this anchor point 202 and another anchor or tie point that is selected on another tree 302 that is located a horizontal distance away from the stand-equipped tree 300. This delivery line 400' is setup by securely attaching one of its ends to the anchor point on the tree 302 toward which the hunter wants to convey the container when he/she later occupies the tree stand. This anchor point on tree 302 is reachable from ground and lower than the elevation at which the hunter will subsequently occupy the tree stand. Carrying the other end of the delivery line 400', the hunter climbs up to the tree stand 200, where the hunter then pulls the line 400' taught in order to remove excess slack therefrom and secures this second end of the delivery line 400' to a suitable tie or anchor point on the tree stand 200 or tree 300. The delivery line 400' is thus now installed in a sloped orientation running down from a first point at or near the tree stand 200 to a lower point on the distal tree 302.

Remaining in the tree stand, the hunter pulls out the container 10' from a pocket or pack, unlocks the cap and base from one another and extends the container into the expanded condition. A tether line 402 is then tied to another anchor point 204 on or near the tree stand, and has a nearby one of its ends 402a tied around the pulley support handle 52. With reference to FIG. 7A, the retaining pin 58 is removed from the releasable end 52b of the pulley support handle 52, which is then lifted from the cap 20' in order to open the access space between the releasable handle end 52*b* and the topside 54 of the cap 20'. Using this access space, the container is slipped into a position in which the open handle 52 spans over the delivery line 400' with the remainder of the container residing beneath the line 400'. The handle 52 is closed and re-locked in place over the delivery line 400' with the retaining pin 58, and the pulley 50 is placed atop the delivery line 50, as shown in FIG. 7B. The pulley support handle 52 thus hooks over the delivery line 400 and cooperates with the topside of the cap to close fully therearound, whereby the container is hung from the line 400' in a manner preventing separation therefrom.

Referring to FIG. 7B, the container is then loaded with burning scent sticks 100 in the same manner described above for the first embodiment (removal of the plug, and reinstallation of same with burning scent sticks supported thereon). With the pulley 50 rollingly placed on the line 400', the container 10' hangs from the line 400' in an upright orientation with the burning scent sticks enclosed within the container interior in corresponding upright positions seated in the base plug 30. With the scent sticks now ready for delivery down toward the ground in order to dispense animal luring scent near ground level, the tether line 402 is untied from its point of anchor near the container-tied end 402*a*, and as shown in FIG. 7C, the tether line is used restrain the rolling of the container down the line 400' on its pulley, whereby the hunter can control the rate of the container's descent down the delivery line 400', and cease this descent once the container has reached a desired scent-distribution location at a point along this line 400' that resides at a distance outward from the stand-equipped tree 300 at an elevation nearer to ground than the tree stand. At this point, the tether line 402 can be re-tied to the anchor point 204 at or near the tree stand 200 in order to hold the container in this position. If the scent sticks are fully consumed, the tether line 402 can be freed from its anchor point and pulled in order to roll the pulley-supported container 10' back up the delivery line 400' to the tree stand 200 for reloading of the container with new scent sticks.

The container is preferably made of plastic, thereby presenting the advantages of lightweight structure, non-combustible material and a resilient flexibility that provides a good friction-based self-locking action between the tapered wall sections when telescopically extended. It will be appreciate that locking mechanisms other than threaded connections may be employed to secure the base and cap of the container together in the collapsed condition, for example using releasable snap fit tabs, or engagement of a lock pin, carabiner or the like through lugs on the perimeter peripheral walls that overlap in an aligning manner when the cap and base are brought together. Likewise, detachable connection of a plug or other removable scent stick support may be achieved by means other than a threaded connection.

In addition, it should be pointed out that the second embodiment container could slide down the angled delivery line 400' without the use of a pulley, for example by way of a direct sliding interface between the handle 52 and the line, but the use of a pulley reduces friction and minimizes noise emitted by the conveyance of the container along the line that might otherwise scare game away from the hunting area. It will be appreciated that instead of downwardly tapering wall sections arranged largest to smallest toward the base when the container is extended, upwardly tapering wall sections arranged largest to smallest moving up the series may alternatively be employed without changing the expansion and collapse functionality of the container. Likewise, the number of telescopically mated wall sections may be varied from the five sections of the illustrated embodiments.

Since various modifications can be made in my invention as herein above described, and many apparently widely different embodiments of same made within the scope of the claims without department from such scope, it is intended that all matter contained in the accompanying specification shall be interpreted as illustrative only and not in a limiting sense.

The invention claimed is:

1. A scent dispensing system comprising:
   a scented stick product comprising a stick having a predetermined length and, carried on said stick, a combination of combustible material and combustion-released aromatic;
   a container comprising:
   a base;
   a cap overlying the base; and
   an intermediate container section comprising a series of wall sections joining the base and cap together and being movable relative to one another to expand and collapse the intermediate container section along a longitudinal axis that passes through said base and said cap in order to move said base and said cap away from and toward one another to enlarge and reduce an enclosed interior space of the container between said base and cap, the intermediate section being expandable to an extended state in which an axial length of the container measured between the base and the cap within the enclosed interior space exceeds the predetermined length of the scented stick product, and collapsible to a collapsed state in which the axial length of the container measured within the enclosed interior space between the base and the cap is less than the predetermined length of the scented stick product;
   a scent stick support arranged to support the scented stick product in position standing upright from the base toward the cap with the intermediate container section expanded into the extended state; and
   at least one opening in the container arranged to communicate the enclosed interior space with an external environment outside the container, at least when said intermediate container section is in the extended state;
   a pulley handle pivotally attached to the to the cap at a hinged end of said pulley handle to enable lifting and lowering of an opposing releasable end of the handle that is selectively lockable to and releasable from the cap, whereby selective unlocking of the releasable end of the handle enables raising and lowering thereof about a pivot axis of the hinged end to open and close an access space between the cap and the releasable end of the handle; and
   a pulley rotatably supported on the pulley handle at an underside thereof in a position located between the hinged and releasable ends of the handle, said pulley being rotatable about a rotation axis lying perpendicular to the pivot axis of the pulley handle;
   whereby the pulley handle and the pulley are configured to enable placement of the pulley onto a delivery line by unlocking and raising of the releasable end of the handle from the cap to open up the access space and pass the raised releasable end of the handle over said delivery line, followed by lowering of the releasable end back into locked engagement with the cap so that the handle spans over the delivery line in a closed position placing the pulley into rolling engagement atop said delivery line with the handle and cap closing fully around the delivery line to prevent separation of the container therefrom, thereby enabling rollable support of the container by the pulley on the delivery line for zip-line conveyance therealong.

2. A scent dispensing system comprising:
a container comprising:
   a base;
   a cap overlying the base; and
   an intermediate container section spanning around an enclosed interior space of the container between said base and cap;
a scent stick support arranged to support a scented stick product in position standing upright from the base toward the cap within the interior space of the container;
at least one opening in the container arranged to communicate the enclosed interior space with an external environment outside the container to dispense a scent from the scented stick product to said external environment; and
a pulley handle pivotally attached to the to the cap at a hinged end of said pulley handle to enable lifting and lowering of an opposing releasable end of the handle that is selectively lockable to and releasable from the cap, whereby selective unlocking of the releasable end of the handle enables raising and lowering thereof about a pivot axis of the hinged end to open and close an access space between the cap and the releasable end of the handle; and
a pulley rotatably supported on the pulley handle at an underside thereof in a position located between the hinged and releasable ends of the handle, said pulley being rotatable about a rotation axis lying perpendicular to the pivot axis of the pulley handle;
whereby the pulley handle and the pulley are configured to enable placement of the pulley onto a delivery line by unlocking and raising of the releasable end of the handle from the cap to open up the access space and pass the raised releasable end of the handle over said delivery line, followed by lowering of the releasable end back into locked engagement with the cap so that the handle spans over the delivery line in a closed position placing the pulley into rolling engagement atop said delivery line with the handle and cap closing fully around the delivery line to prevent separation of the container therefrom, thereby enabling rollable support of the container by the pulley on the delivery line for zip-line conveyance therealong.

3. A method of using the system of claim 1 comprising:
unlocking the releasable end of the handle from the cap;
raising the releasable end of the handle upwardly from the cap, passing the releasable end of the handle over the delivery line and relocking the releasable end of the handle to the cap to secure the handle in the closed position spanning over the delivery line; and
placing the pulley into rolling engagement atop the delivery line.

4. The method of claim 3 further comprising using a tether line tied to the container to gradually lower the container along a sloped travel path of the delivery line by gradually letting out the tether line.

5. The method of claim 4 comprising using the delivery line to lower the container toward ground level from an elevated tree stand in a controlled manner using the tether line.

6. The method of claim 5 further comprising ceasing descent of the container along the sloped travel path at a selected point therealong, and tying the tether line to an anchor point to maintain the container at said selected point.

7. The method of claim 6 further comprising untying the tether line from the anchor point, and pulling in the tether line to draw the container upwardly along the sloped path back to the tree stand.

8. The method of claim 7 further comprising reloading the container with one or more new scent sticks, and letting out the tether line to once again lower the container downwardly along the sloped travel path to a desired scent distribution point therealong.

9. A method of using the system of claim 2 comprising:
unlocking the releasable end of the handle from the cap;
raising the releasable end of the handle upwardly from the cap, passing the releasable end of the handle over the delivery line and relocking the releasable end of the handle to the cap to secure the handle in the closed position spanning over the delivery line; and
placing the pulley into rolling engagement atop the delivery line.

10. The method of claim 9 further comprising, with using a tether line tied to the container to gradually lower the container along a sloped travel path of the delivery line by gradually letting out the tether line.

11. The method of claim 10 comprising using the delivery line to lower the container toward ground level from an elevated tree stand in a controlled manner using the tether line.

12. The method of claim 11 further comprising ceasing descent of the container along the sloped travel path at a selected point therealong, and tying the tether line to an anchor point to maintain the container at said selected point.

13. The method of claim 12 further comprising untying the tether line from the anchor point, and pulling in the tether line to draw the container upwardly along the sloped path back to the tree stand.

14. The method of claim 13 further comprising reloading the container with one or more new scent sticks, and letting out the tether line to once again lower the container downwardly along the sloped travel path to a desired scent distribution point therealong.

* * * * *